US006807589B2

United States Patent
Apfeldorfer et al.

(10) Patent No.: US 6,807,589 B2
(45) Date of Patent: Oct. 19, 2004

(54) MULTIRATE CIRCULAR BUFFER AND METHOD OF OPERATING THE SAME

(75) Inventors: Raphel Apfeldorfer, Versailles (FR); Emmanuel Neuville, Montigny le Bretonneux (FR)

(73) Assignee: Nortel Networks S.A., Cèdex (FR)

( * ) Notice: Subject to any disclaimer, the term of this patent is extended or adjusted under 35 U.S.C. 154(b) by 0 days.

(21) Appl. No.: 10/062,263

(22) Filed: Feb. 1, 2002

(65) Prior Publication Data

US 2004/0039867 A1 Feb. 26, 2004

(30) Foreign Application Priority Data

Feb. 6, 2001 (EP) .............................. 01400293

(51) Int. Cl.[7] ................................. G06F 3/00
(52) U.S. Cl. ..................... 710/52; 710/53; 710/56
(58) Field of Search .................. 710/52–57

(56) References Cited

U.S. PATENT DOCUMENTS

| 4,888,739 | A | * | 12/1989 | Frederick et al. | ........... | 365/221 |
|---|---|---|---|---|---|---|
| 5,363,485 | A | * | 11/1994 | Nguyen et al. | ............. | 395/250 |
| 5,426,756 | A | * | 6/1995 | Shyi et al. | ................... | 395/425 |
| 5,471,583 | A | * | 11/1995 | Au et al. | ..................... | 395/250 |
| 5,506,809 | A | * | 4/1996 | Csoppenszky et al. | ...... | 365/221 |
| 5,537,552 | A | * | 7/1996 | Ogasawara et al. | ......... | 395/250 |
| 5,923,900 | A | * | 7/1999 | Soell et al. | .................. | 395/860 |
| 6,101,329 | A | * | 8/2000 | Graef | .......................... | 395/872 |

FOREIGN PATENT DOCUMENTS

EP 85114669.6 7/1986

OTHER PUBLICATIONS

EPO, European Search Report EP 01 40 0293.
IBM Technical Disclosure Bulletin, vol. 23 No. 3 Aug. 1980 XP 000713392 Entitled: Reliable Data buffer Which Provides For Both One– and Two–Byte Operations by D.J. Lang and R. G. Nelson.
Lang, "Highly Reliable Data Buffer Which Provides for Both One– and Two–Byte Operations", IBM Technical Disclosure Bulletin, vol 23, No 3, 8/80, pp 1218–1219.

* cited by examiner

Primary Examiner—Jeffrey Gaffin
Assistant Examiner—Alan Chen
(74) Attorney, Agent, or Firm—Barnes & Thornburg (57) ABSTRACT

A circular buffer for use in a telecommunications system is described as well as a method of operating the same in which data is protected during wraparound procedures. In the operation of the circular buffer at least four reference values are stored to enable address calculations: a first reference value representative of a begin address of the circular buffer; a second reference value representative of an end address of the circular buffer; a third reference value representative of a current write address of the circular buffer; and a fourth reference value representative of a current read address of the circular buffer. The cyclic state of the buffer is also monitored in order to protect the data after a wraparound or when the buffer is full. The buffer is able to accommodate multirate data arrival.

24 Claims, 7 Drawing Sheets

MULTIRATE CIRCULAR BUFFER AND METHOD OF OPERATING THE SAME

The present invention relates to circular buffers and methods of operating the same especially for applications in telecommunications systems and methods and in computers more especially those in which multirate data has to be received and stored temporarily. For example, such applications may include digital signal processing (DSP), channel equalization, channel coding, interleaving, compression, encryption, speech encoding and decoding, etc.

BACKGROUND OF THE INVENTION

There are many applications in telecommunications in which data is received at different data rates, e.g. when transmitting or receiving uncompressed or compressed speech messages, video, data, fax. The "multi-media revolution" requires the transmission and reception of a wide variety of data types, formats and rates. Such data is often processed by algorithms which require temporary storage or buffering of the data while this processing is carried out. Once processed all record of the data is deleted from memory or overwritten by the next data to be processed.

One way of buffering such data is in a circular buffer. Hardware solutions for such buffers have achieved a high level of sophistication. These solutions are often based on modulo arithmetic for the calculation of addresses in memory because such arithmetic can be carried out very efficiently in a digital system. However, when dealing with data which may arrive at different data rates there exists a problem as how to optimize the size of memories used to buffer the data. Third generation mobile telecommunications systems such as UMTS require multirate data processing, the data rate changing potentially with each frame. Transport channels are the transfer services offered by Layer 1 to MAC and higher layers. The difficulty in implementing a UMTS physical layer is that transport channels have highly variable rate that can change every frame (10 ms). This requires a very adaptive memory management. The baseband modem has to store variable size packets of data corresponding to variable rate transport channels. Nevertheless, the modem is limited to by radio bandwidth. For instance, it has to handle a finite number N of 384 kbps transport channels, or alternatively 3×N 128 kbps channels, or 32×N 12 kbps channels. The memory has to be optimized to handle effectively all these cases.

One solution to this problem is proposed in U.S. Pat. No. 6,005,898. The rate is kept constant as far as the processing circuitry is concerned by duplicating signals for low data rates so that the processing circuitry receives the same data rate independent of the received data rate. This known technique makes use of time diversity to provide the extra bits at low data rates which may help to improve signal quality. However, this technique has the disadvantage that the full data rate is used independent of the received data rate. The power consumption of mobile telephones is important for battery life. Power consumption of data intensive processing tasks is largely dependent on memory accesses. As using the maximum data rate at all times means using the maximum number of data accesses to process any of the data, this solution is not optimized as to power consumption, memory usage or cost (oversize memories).

Another method is to provide a plurality of memories and to use one memory type for each data rate. This technique makes inefficient use of memory, as some of the memory may lie idle for long periods until a particular data rate is used. If the memory used is RAM which requires continuous refreshment then power consumption is not optimal. U.S. Pat. No. 5,659,698 proposes one solution to this problem. It provides a circular buffer which can be addressed by two different data sizes. A first size is determined by an offset and a second size by a sliding address. This technique has a disadvantage when the data rate varies greatly. In this case, data may be wrapped around to the beginning of the circular buffer and overwrite data which is still required. '698 states particularly that the data dealt with by the sliding address should have little or no chance of reaching the end of the buffer. To prevent this a large buffer could be used but then the use of memory is non-optimal.

There is a need for a more optimal design of circular buffer which combines a better use of memory space and optimizing power consumption while also being able to deal efficiently with data arriving at different data rates.

An object of the present invention is to provide a circular buffer and a method of operating the same which has improved optimization of power usage and memory size.

Another object of the present invention is to provide a circular buffer and a method of operating the same which has an improved performance for the temporary storing of data at variable data rates.

SUMMARY OF THE PRESENT INVENTION

The present invention provides a method of generating an address for a circular buffer in a memory, comprising the steps of:

storing a first reference value representative of a begin address of the circular buffer;
storing a second reference value representative of an end address of the circular buffer;
storing a third reference value representative of a current write address of the circular buffer;
storing a fourth reference value representative of a current read address of the circular buffer; and
protecting data stored in memory locations within the circular buffer to prevent stored data being overwritten by further data. Preferably the method further comprises the step of: storing a fifth reference value representative of the cyclic state of the circular buffer. Preferably, the fifth value is a Boolean value. The method preferably includes the step of preventing writing of data into the circular buffer depending upon the value of the fifth value. Typically, the Boolean value of the fifth value has one of two binary values, and the fifth value changes from one binary value to another as the value of either of the third and fourth value changes such as to pass the address of the end of the circular buffer. In the case of an incrementing buffer, the step of writing data into the circular buffer may be determined by the following truth table:

| | | |
|---|---|---|
| second value > third value > fourth value | fifth value = one binary value | buffer has free memory locations and these can be allocated |
| third value < fourth value < second value | fifth value = other binary value | buffer has free memory locations and these can be allocated |
| fourth value = third value | fifth value = one binary value | buffer has free memory locations and these can be allocated |
| fourth value = third value | fifth value = other binary value | buffer is full and no memory locations can be allocated |

For a decrementing circular buffer a similar table applies. Typically, the data to be stored in the circular buffer is received at at least a first and a second data rate and an amount of memory space is allocated in the circular buffer in accordance with the data rate. The buffer may be implemented in any suitable memory, but especially on-chip or off-chip Random Access Memory (RAM). Typically, the circular buffer is used in a mobile telecommunications system.

The present invention provides a circular buffer having an address generator for generating an address for the circular buffer in a memory, comprising:

a first memory storage location storing a first reference value representative of a begin address of the circular buffer;
a second memory storage location storing a second reference value representative of an end address of the circular buffer;
a third memory storage location storing a third reference value representative of a current write address of the circular buffer;
a fourth memory storage location storing a fourth reference value representative of a current read address of the circular buffer; and
a memory controller for protecting data stored in memory locations within the circular buffer to prevent stored data being overwritten by further data. The circular buffer may also comprise a fifth memory storage location storing a fifth reference value representative of the cyclic state of the circular buffer. The memory controller is advantageously adapted to prevent writing of data into the circular buffer depending upon the value of the fifth value. Typically the fifth value has one of two binary values, and the memory controller is adapted to change the fifth value from one binary value to another as the value of either of the third and fourth value changes such as to pass the address of the end of the circular buffer. If the buffer is an incrementing buffer, the memory controller may be adapted to allow writing of data into the circular buffer as determined by the following truth table:

| | | |
|---|---|---|
| second value > third value > fourth value third value < fourth < second fourth < | fifth value = one binary value | buffer has free memory locations and these can be allocated |
| | fifth value = other binary value | buffer has free memory locations and these can be allocated |
| fourth value = third value | fifth value = one binary value | buffer has free memory locations and these can be allocated |
| fourth value = third value | fifth value = other binary value | buffer is full and no memory locations can be allocated |

Typically the data to be stored in the circular buffer is received at at least a first and a second data rate and the memory controller is adapted to allocate an amount of memory space in the circular buffer in accordance with the data rate.

The present invention may also provide a mobile telecommunications system comprising a circular buffer as described above. The circular buffer may be included in any component of the system such as in one or more of a mobile or stationary user equipment, a base station transceiver, a repeater, a mobile switching center.

A circular buffer in accordance with the present invention allows effective implementation of variable size messages to transmit and receive data in real time environment.

The present invention will now be described with reference to the following drawings.

DESCRIPTION OF THE ILLUSTRATIVE EMBODIMENTS

The present invention will be described with reference to certain embodiments and drawings but the present invention is not limited thereto but only by the claims. In particular, the present invention may be implemented equally well in hardware or software. The present invention will mainly be described with reference to mobile radio telecommunications systems but the present invention is not limited thereto. In the following an incrementing circular buffer will be described but the skilled person will appreciate that the present invention is not limited thereto but includes decrementing circular buffers as well. With reference to the addressing of memory locations in a buffer the present invention is not limited to any specific method, e.g. relative addressing, absolute addressing.

Figure 1:
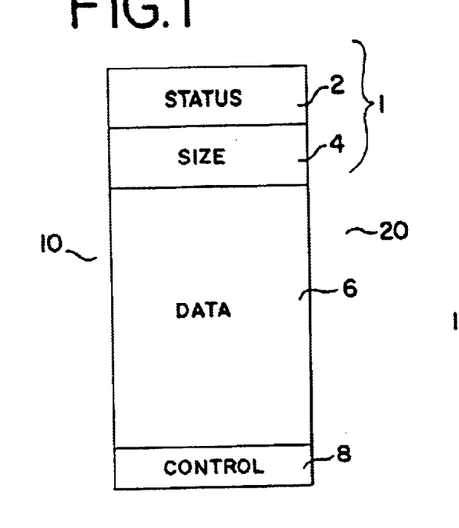
FIG. 1 shows a message space in accordance with an embodiment of the present invention for storing data in a circular buffer.

One aspect of the present invention relies on an implementation of a circular buffer that solves the problems mentioned above, especially for multirate data. The present invention relates to the buffering of data in a circular buffer 20 which may find advantageous use in a mobile telecommunications system, for example in a mobile telephone or in a base station. The allocation of space in the buffer will be described in accordance with embodiments of the present invention in the form of storing messages 10 (see FIG. 1) in the circular buffer. The messages 10 are part of the circular buffer 20 that delimits the memory area that can be allocated to the system tasks. A message 10 carries a Data part 6 that contains the information transmitted in the real time system, e.g. UMTS. Within a transmitter or receiver or other processing equipment it is exchanged between different tasks that perform processing of the information. Each message 10 has a header 1 containing its Status 2 and its Size 4. The Status field can take several values, e.g. FREE, USED or END. When a message 10 is allocated to memory (data is read in), its status transits from FREE to USED. When it is freed, it transits from USED to FREE. The END value is used to designate that there is no message beyond this position and that the next messages are to be allocated at the beginning of the buffer. Optionally, a Control Word 8 may be written at the end of an allocated message 10 to check that a message has really been filled with the specified size and that the buffer content is not corrupted. Either of the Control Word 8 or the header 1 information or both of these may be used to check data integrity. Overflow at the beginning or end of a message will cause corruption of data which can be determined by monitoring the control word and/or the header. This may optionally be performed throughout the life of a particular message. This header and/or control word monitoring can comprise one aspect of the data protection within the buffer which is an aspect of the present invention.

Figure 2:
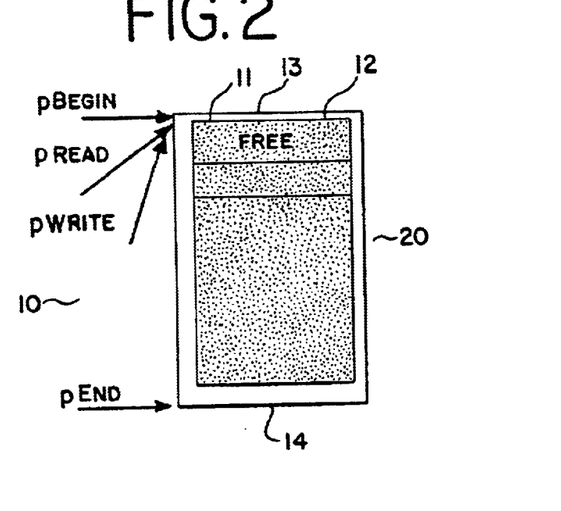
FIG. 2 shows the initial state of a circular buffer according to the invention.

The circular buffer 20 is controlled by maintaining pointers stored in memory, e.g. stored in registers or similar memory locations, that delimit free and used areas in the circular buffer 20 (see FIG. 2). The memory controller may be carried out by a separate hardware controller or may be implemented in software as part of a computer program. In the following reference will be made to pointers and registers but the present invention is not limited thereto, nor is it anticipated that the present invention is limited by the type of memory use, e.g. EEPROM, SRAM nor how the memory management and addressing is implemented. In systems which do not use pointers and/or registers equivalent control means are generally provided, e.g. handles, which may be stored in any suitable way, e.g. on a stack. or in a separate memory. Preferably, five registers or memory locations are used to store the address control data for the circular buffer:

Register 1 contains a pointer of value pBegin which points to the beginning address 11 of the circular buffer 20.

Register 2 contains a pointer of value pRead which points to the beginning of a read section 12 of the circular buffer 20.

Register 3 contains a pointer of value pWrite which points to the beginning address 13 of a write section of circular buffer 20.

Register 4 contains a pointer of value pEnd which points to an address 14 at the end of the circular buffer.

Register 5 FlagLoop contains a pointer of a Boolean value 15, e.g. TRUE or FALSE. The value changes each time pRead or pWrite passes the end of the circular buffer and is returned to the beginning of the buffer in a wrap-around procedure.

As shown in FIG. 2, at the beginning, the buffer 20 contains only a FREE message indicating that the entire area is ready to be allocated, starting at address pRead which at this point of time has the same address as pBegin and pWrite.

Figure 3:
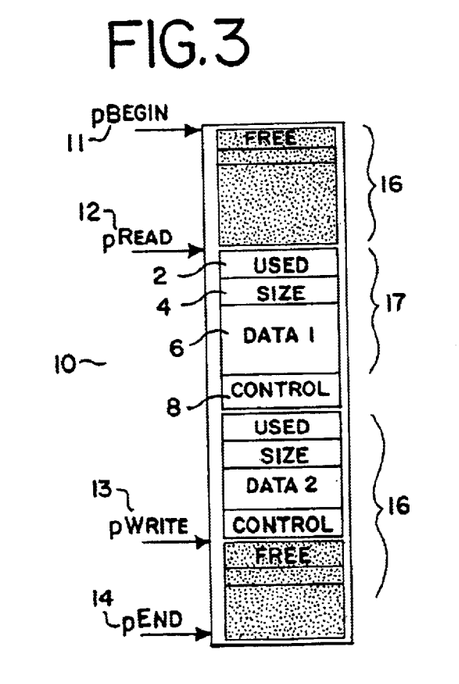
FIGS. 3 and 4 show the circular buffer of FIG. 2 at later times.

As shown schematically in FIG. 3, during its lifetime, the buffer is composed of two parts. A part 16 composed of FREE messages, which, as shown in the figure, has ranges from addresses pWrite to pEnd, and pBegin to pRead when FlagLoop=FALSE. When a new message is needed (a new space in memory is required), an area is allocated by storing the values of the Status field 2, the Size field 4 of the message and optionally the Control Word field 6 beginning at the current pWrite address. Also a part 17 comprises USED messages, (i.e. allocated and stored data) which ranges from the addresses pRead to pWrite when FlagLoop= FALSE. When a message is freed, the Status is set to FREE. If the message beginning at address pRead is freed, address pRead is moved to the next USED message and the relevant register updated with the new address value. The value of pRead continues pointing to the first USED message of the section. In this example, FlagLoop has the value FALSE, meaning that the address pWrite has not reached the end address of the buffer (pEnd) yet.

Figure 4:
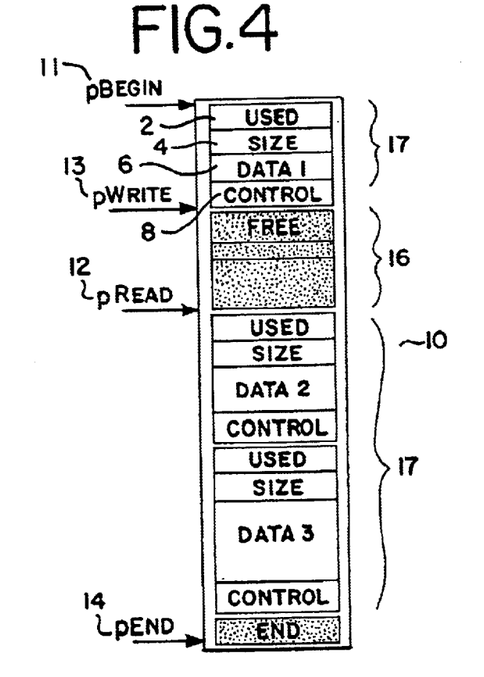

When some more messages have been allocated, the value of pWrite changes, pointing to addresses closer to the end of the circular buffer but always to a FREE message area. When the next data to be allocated results in pWrite reaching beyond address pEnd of the buffer, it sets the Status field of the last message to END, and starts writing at the beginning of the buffer 20 for the next message as shown in FIG. 4, that is it wraps-around as is generally required for a circular buffer. FlagLoop changes to TRUE at each wraparound of pWrite; and FlagLoop changes to FALSE for each wrap-around of pRead.

In accordance with an aspect of the present invention, this wrap-around procedure is preferably controlled in a secure way to prevent overwriting data which has not yet been consumed, i.e. is still required. This data security means may be provided by the combination of the FlagLoop, pWrite and pRead registers and a control algorithm which takes into account the cyclic memory location usage of a circular buffer. When pWrite would become greater than pEnd, pWrite is put back to pBegin, and FlagLoop is set to TRUE. Hence, FlagLoop has the value TRUE when pRead is closer to the end of the circular buffer than pWrite. FlagLoop has the value FALSE when pRead is closer to the beginning of the circular buffer than pWrite. Two control cases occur. If FlagLoop is set to FALSE and pRead catches up with pWrite then the complete buffer is free. If FlagLoop has the value TRUE and pWrite catches up with pRead the buffer no longer has memory locations free to allocate. In this case the next message will be stored in another circular buffer, e.g. by creation of a buffer in accordance with routine 200 (FIG. 7), or discarded if no new or existing buffer is available. In the special case that pRead points to the same address as pBegin and pWrite has not yet reached the end of the buffer then FlagLoop is set to FALSE. When a new message would take pWrite beyond pEnd, pWrite needs to point to the address pBegin at the beginning of the buffer to start writing a new message. To do so it must wrap-around and FlagLoop will be changed to TRUE. If pWrite equals pRead and FlagLoop is set to TRUE then the memory is full and no further data can be written into this circular buffer. The above may be summarized as a control algorithm determined by the following truth table (assuming that an incrementing buffer is used):

TABLE 1

| pEnd > pWrite > pRead | FlagLoop = FALSE | memory is free and can be allocated |
| pWrite < pRead < pEnd | FlagLoop = TRUE | memory is free and can be allocated |
| pWrite = pRead | Flagloop = FALSE | memory is free and can be allocated |
| pWrite = pRead | Flagloop = TRUE | memory is full |

The present invention includes any routine which is equivalent to an implementation of the above truth table or any apparatus which carries out this routine.

Figure 5:
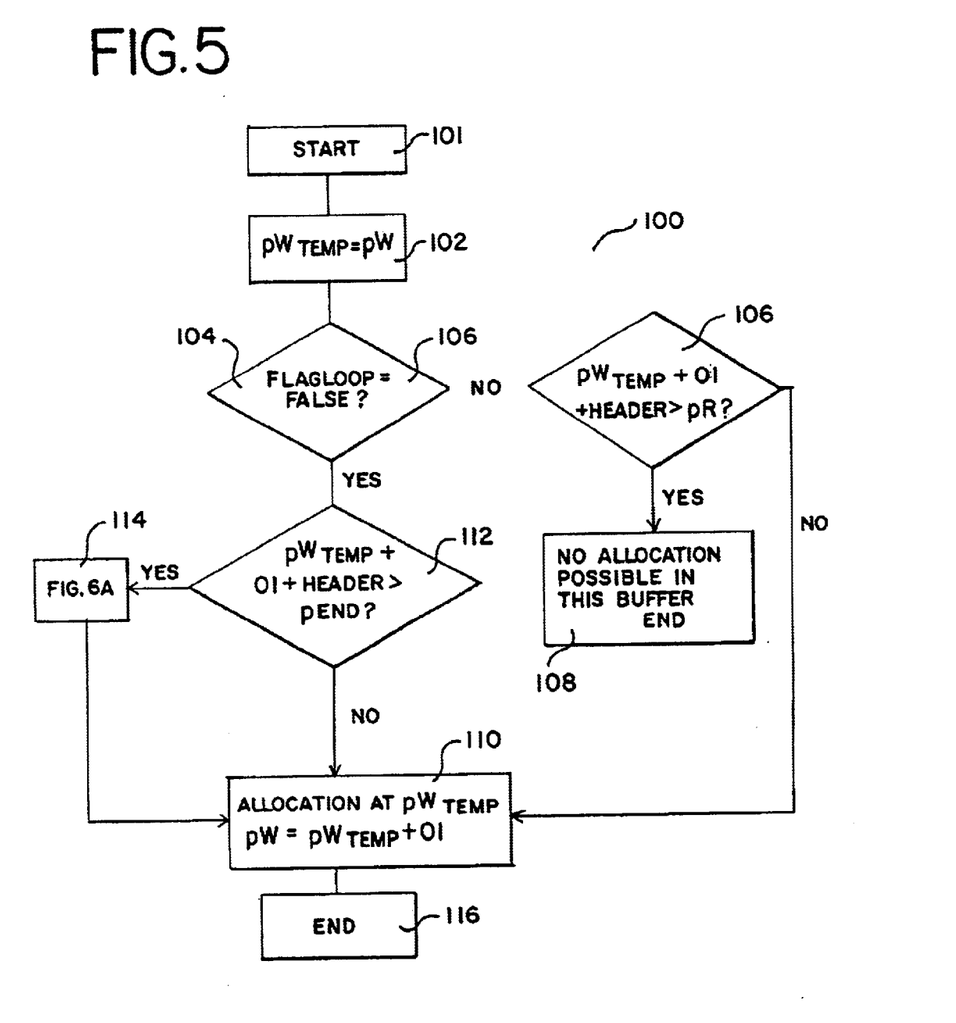
FIGS. 5, 6A and B show schematic flow diagrams of address control in accordance with embodiments of the present invention.
Figure 6A:
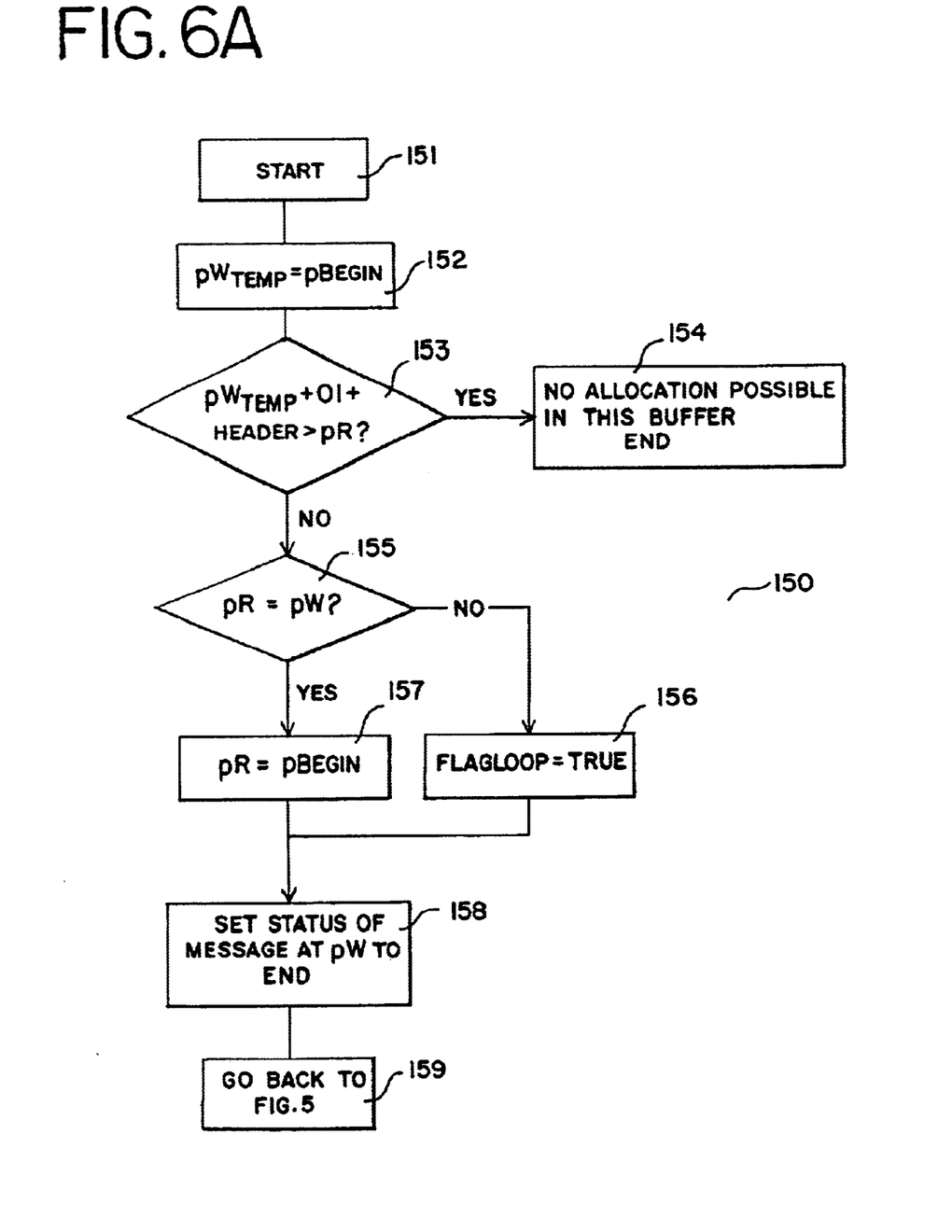
Figure 6B:
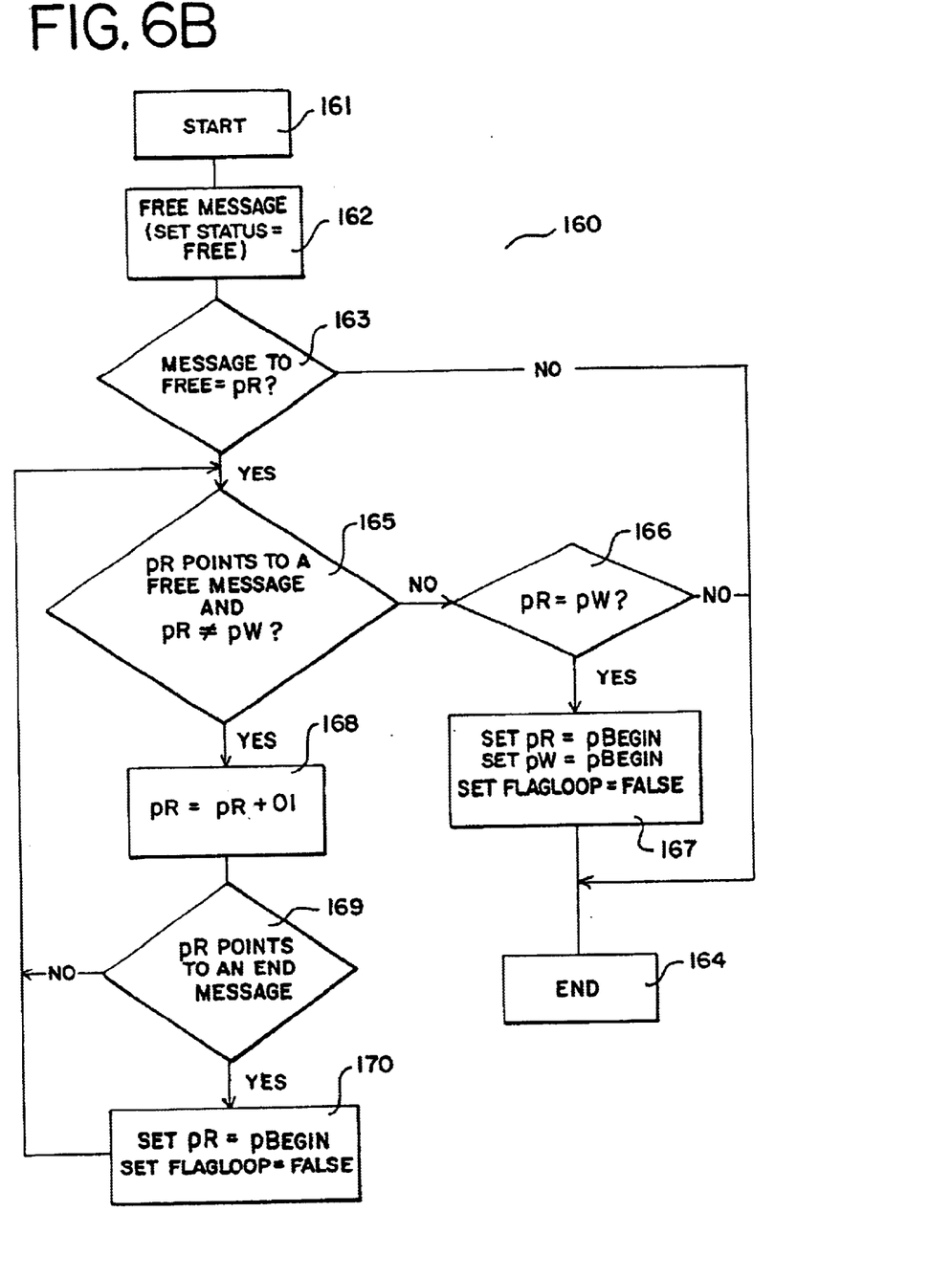
Figure 7:
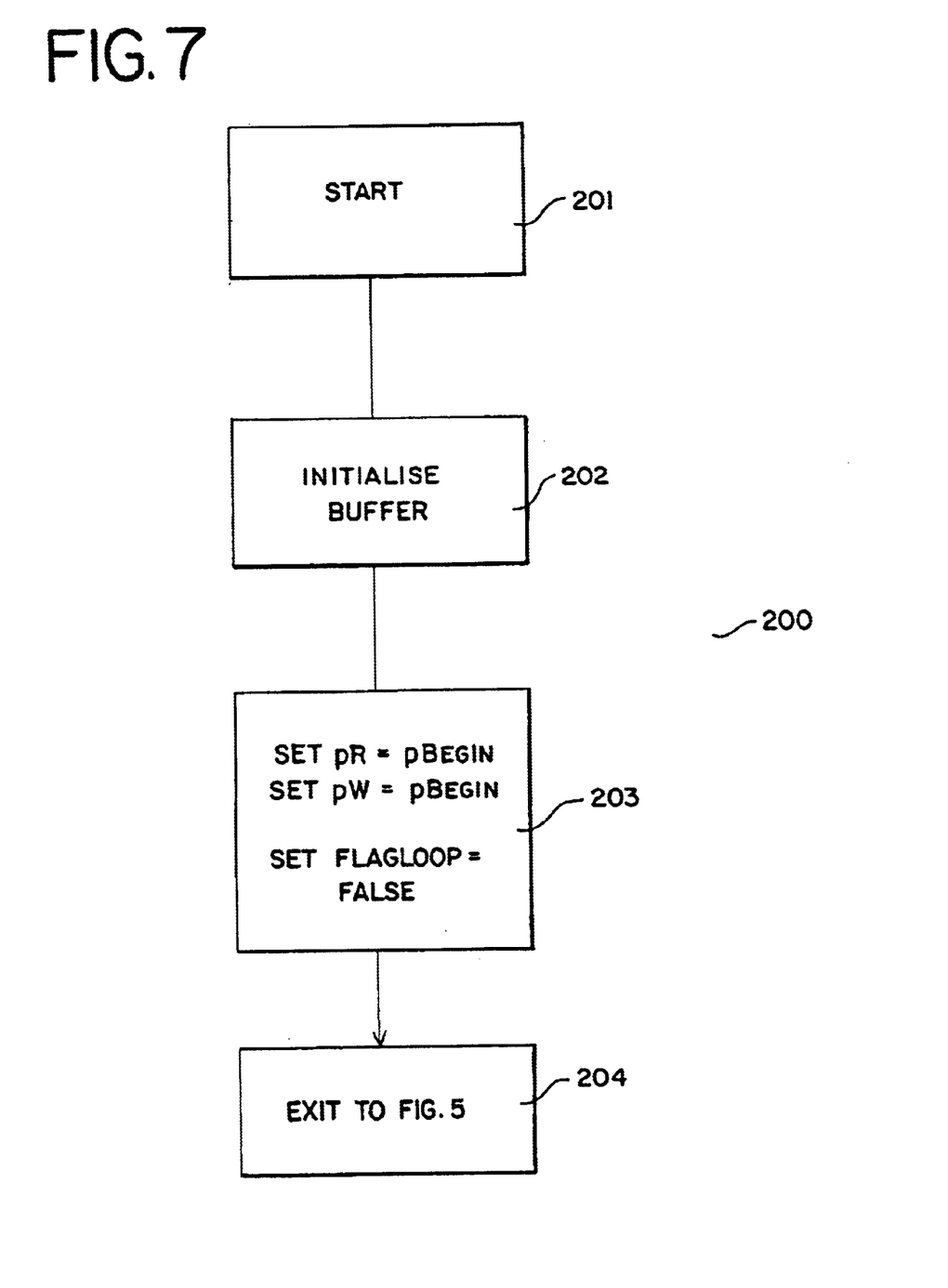
FIG. 7 shows initialising steps for a circular buffer in accordance with the present invention.

Security is preferably provided to make sure that pWrite cannot leapfrog over pRead. This will be described with reference to routines 100, 150,160, and 200 in FIGS. 5, 6A, 6B, 7. Routine 200 of FIG. 7 is called once at the creation of a circular buffer. Routine 100 of FIG. 5 is called each message allocation. The main routine 150 of FIG. 6A is called when a message allocation is done in a non-looping or "non-wraparound" case whereas the branch of step 106 is called when a message allocation with wraparound is required. Routine 160 of FIG. 6B is called when a message is freed.

Firstly, a circular buffer is initialised in accordance with routine 200 and the algorithm passes to FIG. 5. With reference to FIG. 5, in the initial step 102 pWrite is set equal to a temporary value pWrite$_{temp}$ which will be used later when determining a future valid pWrite address. It is then determined if the fourth state of Table 1 exists. This can be done starting with a first step 104 in which it is determined if the current FlagLoop value is FALSE. If YES then the procedure may proceed to step 112. If NO then FlagLoop= TRUE and in the next step 106 it is determined if the allocation of memory space for the next data will take pWrite beyond pRead. It is generally known to use an offset to calculate a new address—see for example U.S. Pat. No. 5,659,698. This offset is determined by the amount of data to be buffered in one message plus any additional fields, e.g. headers. For example, when a new message is to be stored at a data rate D1 each buffer message will require a number of memory locations $O_1$. This value $O_1$ may be stored in a register or similar memory location or could be calculated on the fly. In the present case the value of $O_1$ equals one header and the size of memory allocation to be made for the data plus any additional or optional fields such as a control word 8. When determining whether sufficient memory space is available memory space for two headers must be allowed for: one for the present new message and one for the next new message after the current new one. There must be memory space not only for the present new message but also for initialising the next message. Hence, in step 106 the current value of $pWrite_{temp}$ is augmented by offset $O_1$ plus one header (or decremented in a decrementing buffer) and this new value is compared with the current pRead (FlagLoop=TRUE). If $pWrite_{temp}+O_1+header$ exceeds pRead then there is insufficient space in the buffer and routine 100 exits to find another buffer or to routine 200 to create a new one or the data is discarded. If $pWrite_{temp}+O_1+header$ does not exceed pRead, pWrite is set to $pWrite_{temp}+O_1$ in step 110 and the routine returns the new value of pWrite. The data can then be written into the message.

In step 112 the current value of $pWrite_{temp}$ is augmented by the offset $O_1$ and a header and this value is compared with pEnd (FlagLoop=FALSE). If $pWrite_{temp}+O_1+header$ exceeds pEnd a wraparound procedure is required and routine 100 exits in step 114 to routine 150 (memory allocation) in FIG. 6A. If $pWrite_{temp}+O_1+header$ is less than pEnd then no wraparound is required and the procedure moves to step 110 making $pWrite_{temp}+O_1$ equal to the new current pWrite. The new data may be stored. The routine then goes to END 116 and awaits a new write command.

Routine 150 will now be described with reference to FIG. 6A assuming an incrementing buffer. In a first step 152 the value of $pWrite_{temp}$ is set to pBegin (preparing the wraparound of pWrite). In step 153 $pWrite_{temp}$ is augmented by $O_1$ and a header and it is determined if this new value is greater than the current pRead. If YES there is not enough memory in the buffer, no allocation is possible and routine 150 exits to another buffer or routine 200 or the data is discarded in step 154. If NO the current pWrite is compared with pRead in step 155. If pWrite is not equal to current pRead then pRead has not caught up with pWrite. This is an indication that pWrite is in the process of making a wraparound whereas pRead is not and in this case Flagloop is set to TRUE in step 156 and the routine continues with step 158.

If it is determined in step 155 that the current pWrite equals pRead then pRead has caught up with pWrite and the buffer is completely empty. In this case pRead is set equal to pBegin in step 157. This also means that both pRead and pWrite have performed a wraparound at the same time and FlagLoop does not change. Also the current message (at the position to which the current pWrite points) is the last message in the buffer and the status of this message is set to END in step 158. In step 159 the routine returns to step 110 in routine 100, $pWrite_{temp}+O_1$ is set to the new pWrite and the data is stored in the memory.

Movements of pRead will be described with reference to routine 160 and FIG. 6B and an incrementing buffer. In a first step 162 a message to be freed has its status set to FREE. In step 163 it is determined if pRead points to this message to be freed. If not then the message lies in the body of allocated memory in the buffer and this message can be freed without change of pRead. The procedure goes to END 163 and awaits the next message to be freed. If YES the message is freed and pRead now points to this message which has been freed, i.e. has the FREE status as set in step 161. In the next method steps the routine must move pRead to the next message with a USED status or, if there is no such message, return pRead to pBegin.

It is determined in step 165 whether pRead is not equal to pWrite and pRead points to a FREE message. In the present case the message has a FREE status and provided pWrite does not equal pRead, pRead is moved in step 168 to the beginning of the next message after this free message. That is pRead is moved to the current value of $pRead+O_1$. In step 169 it is determined if pRead now points to a message with an END status. If yes, then pRead must perform a wraparound and pRead is set to pBegin and FlagLoop is set to FALSE in step 170. If NO in step 169 or after the step 170 has been performed, the routine returns to step 165 still looking for a message which does not have a FREE status or when pRead has reached pWrite. If on return to step 165 pRead still points to a FREE message and pRead is not equal to pWrite, pRead must be moved further by repeating steps 168 to 170.

If NO in step 165 there are two possibilities. These are determined in step 166. If pRead=pWrite then the buffer is empty and the initial settings can be set in step 167 and the routine goes to END 163 and awaits the next message to be freed. If NO in step 166 pRead does not point to a FREE message, i.e. it points to the first USED message it has encountered. The routine leaves pRead at this value and exits to END 163 and awaits the next command to free a message.

Routine 200 will now be described with reference to FIG. 7. In step 202 a new buffer is initialised in memory and pWrite is set=pRead=pBegin and FlagLoop=FALSE in step 203. In step 204 this routine returns to step 101 of routine 100 (FIG. 5).

A practical example of the application of the present invention will now be described with reference to FIG. 8. Let us assume that an integrated circuit carrying out data processing can handle up to 2 channels carrying data on UMTS physical channels at Spreading Factor (SF) 4, or 4 channels at SF8, or 8 channels at SF16. In this example the channels only differ by the data rate they use:

1 channel at SF4 needs up to 2400 bytes per frame of storage space
1 channel at SF8 needs up to 1200 bytes per frame of storage space
1 channel at SF16 need sup to 600 bytes per frame of storage space So when an SF4 channel is closed, two SF8 channels can be opened, or four SF16 channels.

At a given frame time, let us assume that 4 channels are active on this integrated circuit (IC), and a real time processing task A is emitting data to another reception task B. The assumption on the real time system is that messages sent by task A are sent not more often than 1 every UMTS frame (10 ms), and that they are received and released at least once every frame. This means that all data received during one frame is consumed by the next frame.

The channels can be deactivated, and new channels can be created, as soon as the total data rate handled by the IC is no more than 2 SF4, with the equivalencies given previously. In a scenario, which might be typical for the operation of a wide-band cellular telecommunication system, after the initial situation where 4 SF8 channels are active, these events take place:

channel 1 is deactivated
two SF8 channels are created: 1a and 1b
channels 3 and 4 are deactivated
a new channel 3 is created at SF4.

Figure 8:
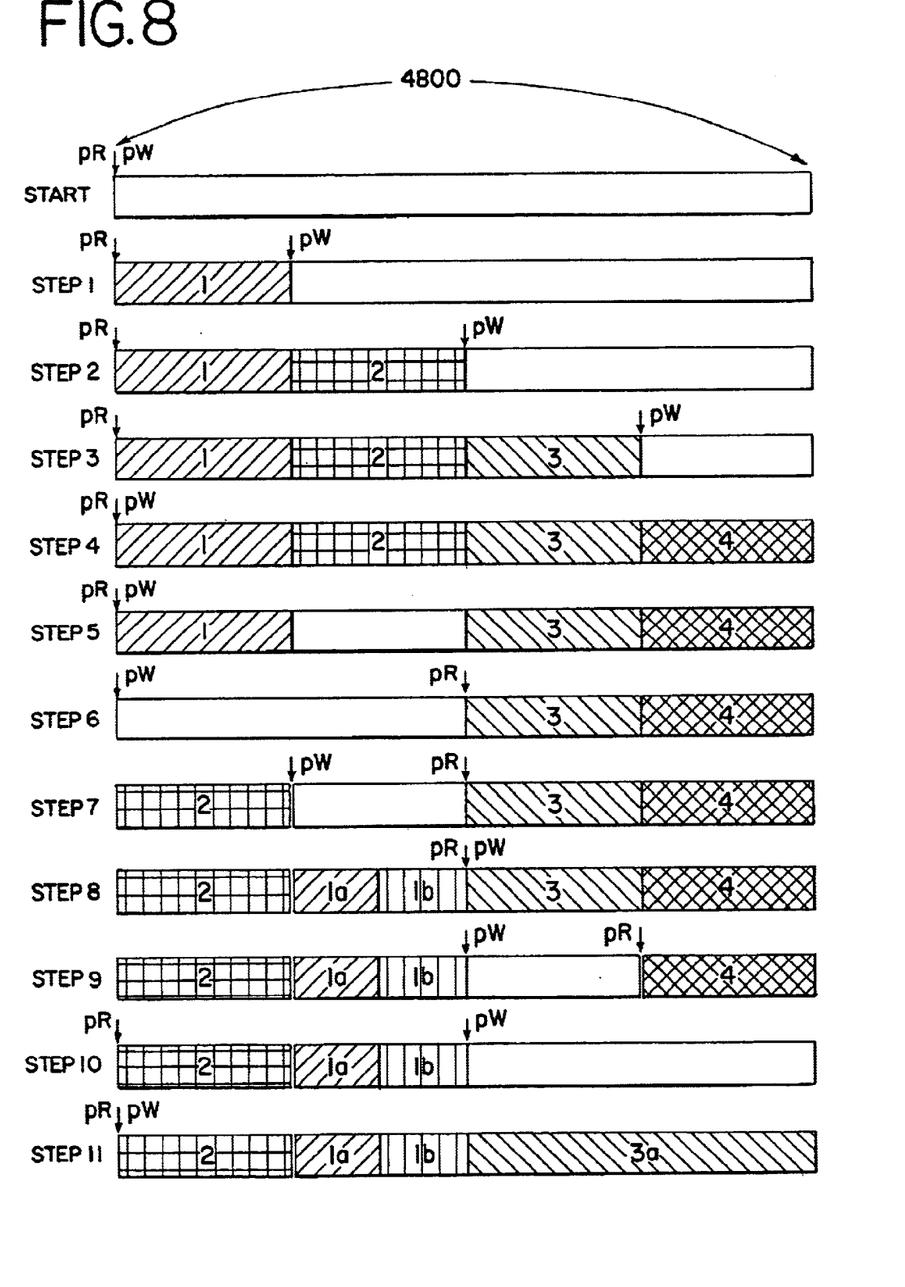
FIG. 8 shows an example of the application of the present invention to multirate data buffering.

First the situation with a conventional buffer is considered. Since there is no protection of the data allocated in the buffer on wraparound, the communication channels must use different circular buffers. Since the data rate of a given channel may increase, it is necessary to dimension the buffers to the maximum needed by a channel. A buffer created to handle a SF4 channel may be used for an SF8 channel, and a buffer created for an SF8 channel may be used for a SF16 channel. The memory necessary to handle the channels in the IC is:

2 SF4: 2×2400=4800 bytes
2 SF8: 2×1200=2400 bytes
4 SF16: 4×600=2400 bytes
Total: 9600 bytes Referring to FIG. 8 in the case of a circular buffer in accordance with one of the embodiments of the present invention all the channels, even if they carry data at different data rates are put in the same circular buffer. In FIG. 8, pW represents pWrite and pR represents pRead. The area allocated to this buffer equals the memory for 2 SF4 channels, so 2×2400 bytes=4800 bytes. As shown in FIG. 8 in steps 1, 2, 3 and 4, task A allocates successively four areas to store data for SF8 channel 1 (1200B), 2, 3 and 4. The circular buffer is then full, and since pRead=pWrite and FlagLoop=FALSE no more memory can be allocated (protection mechanism). At step 5, channel 2 is processed by task B and its allocated memory area is released. Note that areas can be released in any order. Holes are left in the memory, but the real time system ensures that they will naturally be converted into free areas due to the release of all data within one frame duration. At step 6, channel 1 is processed and its area is released. At this point, let us assume that channel 1 is deactivated, and that 2 other channels are set up: SF16 channels 1a and 1b. Note that variable rate channels are handled, as soon as the buffer can handle the total amount of memory allocated. At step 7, task A sends new data on channel 2. Note that it is always possible to allocate memory for this channel since it is assumed that new data can be sent only 1 UMTS frame after any previous data. Therefore, channel 1 data must have already been released when channel 2 area is allocated. At step 8, task A sends data on channels 1a and 1b. At step 9 and 10, task B releases data of channels 3 and 4 and these two channels are deactivated. At step 11, a new channel at SF4 is created: 3a. Task A sends data on channels 3a.

Accordingly, the memory used in accordance with the present invention is 4800 bytes whereas 9600 bytes are required with conventional circular buffers. The skilled person will appreciate that the benefits of the present invention are one or more of the following:
    less memory use
    more flexibility to add channels (for example if 16 SF32 have to be handled, buffers must be added in the conventional systems but not with embodiments of the present invention).
As opposed to conventional implementations, it is possible to allocate memory of the exact needed size. This present invention allows use of a single buffer for all rates. This is a considerable advantage, since N 384 kbps transport channels or 32×N 12 kbps channels require the same amount of memory, but with more or less messages. The size to determine is the total size, and thus, memory is optimally used by only requiring to reserve a circular buffer of the exact size that will be used. The memory allocation function is easily maintained: it is the available amount of memory between pWrite and pRead (or pRead to pEnd+pBegin to pWrite if FlagLoop is TRUE).

The present invention may be implemented in hardware or, for example, in software using a processing engine such as a microprocessor or a programmable logic device (PLD's) such as a PLA (programmable logic array), PAL (programmable array logic), FPGA (field programmable gate array).

Figure 9:
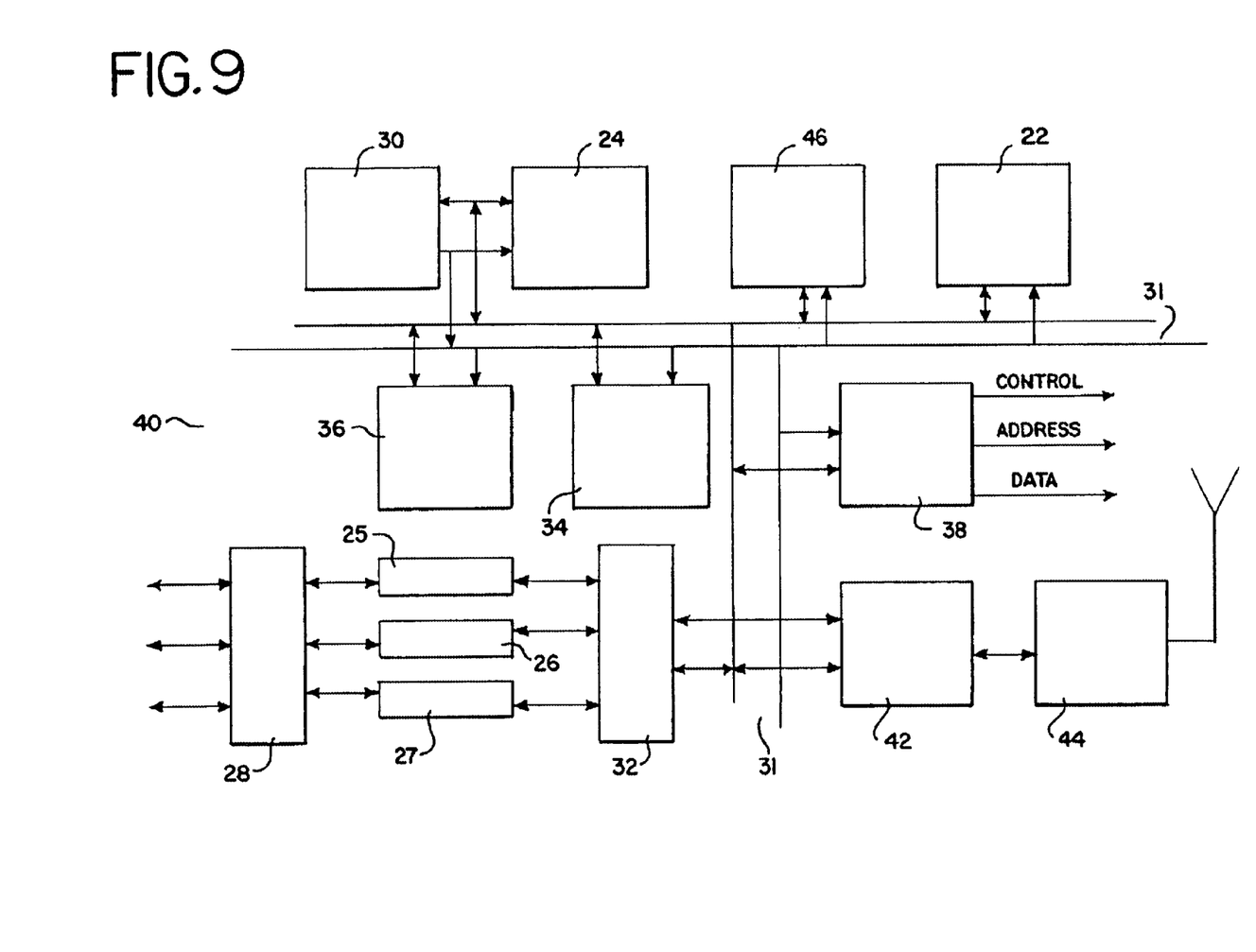
FIG. 9 is a schematic representation of a software solution using an embedded microprocessor in accordance with an embodiment of the present invention.

An example of such a circuit 40 will be described with reference to FIG. 9 for a mobile radio telephone receiver/transmitter. This baseband circuit 40 may be constructed as a VLSI chip around an embedded microprocessor 30 such as an ARM7TDMI core designed by ARM Ltd., UK which may be synthesized onto a single chip with the other components shown. A zero wait state SRAM memory 22 may be provided on-chip as well as a cache memory 24. Various I/O (input/output) interfaces 25, 26, 27 may be provided, e.g. UART, USB, I²C bus interface as well as an I/O selector 28. FIFO buffers 32 may be used to decouple the processor 30 from data transfer through these interfaces. A counter/timer block 34 may be provided as well as an interrupt controller 36. The interface to the radio frequency part is provided by block 42 which can handle the multiplexing and demultiplexing of multi-user baseband data frames as well as transmitting to and receiving from the radio frequency power module 44. Baseband data received by block 42 is passed to the processor 30 for processing. Software programs may be stored in an internal ROM (read only memory) 46. Access to an external memory may be provided an external bus interface 38 with address, data and control busses. The various blocks of circuit 40 are linked by suitable busses 31.

The circular buffer control mechanisms of the present invention may be implemented as software to run on processor 30. The circular buffer may be implemented in SRAM memory 22 under the control of processor 30. The procedures described above may be written as computer programs in a suitable computer language such as C and then compiled for the specific processor in the embedded design. For example, for the embedded ARM core VLSI described above the software may be written in C and then compiled using the ARM C compiler and the ARM assembler.

While the invention has been shown and described with reference to preferred embodiments, it will be understood by those skilled in the art that various changes or modifications in form and detail may be made without departing from the scope and spirit of this invention. For example, one problem in memory management schemes is memory fragmentation. This occurs when messages inside the allocated area (between pRead and pWrite) are freed, but not contiguously. Some holes appears in the area, and pRead pointer is not moved forward until the message on which it points to is freed. Some memory space is not available even if it is not used. This problem can be solved by a <<garbage collecting>> function or defragmentation program that would concatenate FREE areas in a bigger one available for other messages. This would require further processing and a memory management which needs to allow time for defragmentation of the memory. However, the embodiments of the invention disclosed above are close to optimal as the data flows that are processed are volatile, meaning that they have a limited lifetime in the real-time system. These embodiments are optimized in the sense that as messages are allocated on one side of the buffer, the following messages are freed on the other side, since data is to be transmitted in the limited time of one frame on the radio interface. This results in implementations that are applied to the real-time characteristics of the information to be processed, that is information of known limited lifetime and highly variable data rate. Further, reference has been made to address values being stored in memory. These values may be in accordance with any form of address referencing and includes specifying addresses by means of offsets and a base address.

While the invention has been shown and described with reference to preferred embodiments, it will be understood by those skilled in the art that various changes or modifications in form and detail may be made without departing from the scope and spirit of this invention as defined in the attached claims. For instance, in embodiments of the present invention which make use of additional fields in a message for example a control word 8, temporary buffer addresses such as pWrite$_{temp}$ must be incremented by additional memory required for the additional filed(s), e.g. by the data, 2×headers and the additional field(s) in steps such as 106, 112, 153 and by the data, 1×header and the additional field(s) in steps such as 110 and 168.

What is claimed is:

1. A method of storing data in a circular buffer in a memory, comprising:
   generating an address for a circular buffer by:
      storing a first reference value representative of a begin address of the circular buffer;
      storing a second reference value representative of an end address of the circular buffer;
      storing a third reference value representative of a current write address of the circular buffer;
      storing a fourth reference value representative of a current read address of the circular buffer; and
      protecting data stored in memory locations within the circular buffer to prevent stored data being overwritten by further data;
   allocating an amount of memory space of the memory in the circular buffer for storing of data; and
   writing data into an allocated memory space of the memory in the circular buffer as said data is received at the memory.

2. The method according to claim 1, further comprising:
   storing a fifth reference value representative of the cyclic state of the circular buffer.

3. The method according to claim 2, wherein the fifth value is a boolean value.

4. The method according to claim 3, wherein the boolean value of the fifth value has one of two binary values, and the fifth value changes from one binary value to another as the value of either of the third and fourth value changes such as to pass the address of the end of the circular buffer.

5. The method according to claim 2, further comprising:
   preventing writing of data into the circular buffer depending upon the value of the fifth value.

6. The method according to claim 1, wherein the buffer is an incrementing buffer; further comprising the step of writing data into the circular buffer as determined by the following truth table:
   if the second value is greater than the third value which is greater than fourth value and the fifth value is equal to one binary value, the buffer has free memory locations and these can be allocated;
   if the third value is less than the fourth value which is less than the second value and the fifth value is equal to other binary value, the buffer has free memory locations and these can be allocated;
   if the fourth value is equal to the third value and the Fifth value is equal to the one binary value, the buffer has free memory locations and these can be allocated;
   if the fourth value is equal to the third value and the fifth value is equal to the other binary value, the buffer is full and no memory locations can be allocated.

7. The method according to claim 1, wherein the data to be stored in the circular buffer is received at at least a first and a second data rate.

8. The method according to claim 7, wherein the allocating of an amount of memory space in the circular buffer is in accordance with the data rate.

9. The method according to claim 1, wherein the circular buffer is used in a mobile telecommunications system.

10. The method of claim 1, further comprising writing a plurality of messages as data in memory spaces in the circular buffer in an order and liberating an allocated and written memory space of the memory in the circular buffer independent of said order of writing.

11. A circular buffer having an address generator for generating an address for the circular buffer in a memory, comprising:
   a first memory storage location storing a first reference value representative of a begin address of the circular buffer;
   a second memory storage location storing a second reference value representative of an end address of the circular buffer;
   a third memory storage location storing a third reference value representative of a current write address of the circular buffer;
   a fourth memory storage location storing a fourth reference value representative of a current read address of the circular buffer;
   a memory controller for protecting data stored in memory locations within the circular buffer to prevent stored data being overwritten by further data;
   means for allocating an amount of memory space of the memory in the circular buffer for storing of data; and
   means for writing data into an allocated memory space of the memory in the circular buffer as said data is received at the memory.

12. The circular buffer according to claim 11, further comprising:
   a fifth memory storage location storing a fifth reference value representative of the cyclic state of the circular buffer.

13. The circular buffer according to claim 12, wherein the memory controller is adapted to prevent writing of data into the circular buffer depending upon the value of the fifth value.

14. The circular buffer according to claim 13, wherein the fifth value has one of two binary values, and the memory controller is adapted to change the fifth value from one binary value to another as the value of either of the third and fourth value changes such as to pass the address of the end of the circular buffer.

15. The circular buffer according to claim 14, wherein the buffer is an incrementing buffer and the memory controller is adapted to allow writing of data into the circular buffer as determined by the following truth table:

if the second value is greater than the third value which is greater than fourth value and the fifth value is equal to one binary value, the buffer has free memory locations and these can be allocated;

if the third value is less than the fourth value which is less than the second value and the fifth value is equal to other binary value, the buffer has free memory locations and these can be allocated;

if the fourth value is equal to the third value and the fifth value is equal to the one binary value, the buffer has free memory locations and these can be allocated;

if the fourth value is equal to the third value and the fifth value is equal to the other binary value, the buffer is full and no memory locations can be allocated.

16. The circular buffer according to claim 11, wherein the data to be stored in the circular buffer is received at at least a first and a second data rate and the memory controller is adapted to allocate an amount of memory space in the circular buffer in accordance with the data rate.

17. The circular buffer of claim 11, wherein a plurality of messages have been written into memory spaces in the circular buffer in an order, the circular buffer further comprising means for liberating a memory area independent of said order of writing.

18. A mobile telecommunications system comprising a circular buffer having an address generator for generating an address for the circular buffer in a memory, the address generator comprising:

a first memory storage location storing a first reference value representative of a begin address of the circular buffer;

a second memory storage location storing a second reference value representative of an end address of the circular buffer;

a third memory storage location storing a third reference value representative of a current write address of the circular buffer;

a fourth memory storage location storing a fourth reference value representative of a current read address of the circular buffer; and a memory controller for protecting data stored in memory locations within the circular buffer to prevent stored data being overwritten by further data.

19. The mobile telecommunications system according to claim 18, wherein the circular buffer further comprises:

a fifth memory storage location storing a fifth reference value representative of the cyclic state of the circular buffer.

20. The mobile telecommunications system according to claim 18 wherein the memory controller is adapted to prevent writing of data into the circular buffer depending upon the value of the fifth value.

21. The mobile telecommunications system according to claim 20, wherein the fifth value has one of two binary values, and the memory controller is adapted to change the fifth value from one binary value to another as the value of either of the third and fourth value changes such as to pass the address of the end of the circular buffer.

22. The mobile telecommunications system according to claim 21 wherein the circular buffer is an incrementing buffer and the memory controller is adapted to allow writing of data into the circular buffer as determined by the following truth table:

if the second value is greater than the third value which is greater than fourth value and the fifth value is equal to one binary value, the buffer has free memory locations and these can be allocated;

if the third value is less than the fourth value which is less than the second value and the fifth value is equal to other binary value, the buffer has free memory locations and these can be allocated;

if the fourth value is equal to the third value and the Fifth value is equal to the one binary value, the buffer has free memory locations and these can be allocated;

if the fourth value is equal to the third value and the fifth value is equal to the other binary value, the buffer is full and no memory locations can be allocated.

23. The mobile telecommunications system according to claim 18 wherein the data to be stored in the circular buffer is received at at least a first and a second data rate and the memory controller is adapted to allocate an amount of memory space in the circular buffer in accordance with the data rate.

24. The mobile telecommunications system of claim 18, wherein a plurality of messages have been written into memory spaces in the circular buffer in an order, further comprising means for liberating a memory area independent of said order of writing.

* * * * *